US010315725B2

(12) United States Patent
Brewer et al.

(10) Patent No.: US 10,315,725 B2
(45) Date of Patent: *Jun. 11, 2019

(54) BICYCLE WITH REAR DRIVE ASSEMBLY FOR ELLIPTICAL MOVEMENT (71) Applicant: Aruanã Energia S/A, Goiânia-GO (BR)

(72) Inventors: Brian Ray Brewer, Santa Catarina (BR); Robert James McKinnon, Santa Catarina (BR)

(73) Assignee: ARUANÂ ENERGIA S/A, Goiânia (BR)

( * ) Notice: Subject to any disclaimer, the term of this patent is extended or adjusted under 35 U.S.C. 154(b) by 152 days.

This patent is subject to a terminal disclaimer.

(21) Appl. No.: 15/043,321

(22) Filed: Feb. 12, 2016

(65) Prior Publication Data

US 2016/0159429 A1 Jun. 9, 2016

Related U.S. Application Data (63) Continuation of application No. 14/396,488, filed as application No. PCT/BR2013/000473 on Nov. 7, 2013, now Pat. No. 9,260,156.

(30) Foreign Application Priority Data

Nov. 9, 2012 (BR) ...................... 10 2012 028693 9

(51) Int. Cl.
*B62M 3/06* (2006.01)
*B62M 1/24* (2013.01)
(Continued)

(52) U.S. Cl.
CPC ............... *B62M 3/06* (2013.01); *B62K 3/002* (2013.01); *B62M 1/24* (2013.01); *B62M 1/26* (2013.01);
(Continued)

(58) Field of Classification Search
CPC . B62M 3/06; B62M 1/24; B62M 1/26; B62M 1/28; B62M 2700/006; B62K 3/002
See application file for complete search history.

(56) References Cited

U.S. PATENT DOCUMENTS 2,466,105 A 4/1949 Hoffman
3,415,540 A 12/1968 Portnoff
(Continued)

FOREIGN PATENT DOCUMENTS

CH 694761 A5 7/2005
CN 102717858 A 10/2012
(Continued)

OTHER PUBLICATIONS

International Search Report for PCT/BR2013/000473, dated Jan. 8, 2014.

*Primary Examiner* — Anne Marie M Boehler
*Assistant Examiner* — Marlon A Arce
(74) *Attorney, Agent, or Firm* — Blank Rome LLP (57) ABSTRACT A bicycle with a rear drive assembly configured to allow pedal boards to be pivotable while moving in an elliptical trajectory and which allows a cyclist to ride in an erect position is disclosed. A front end of each of the pedal boards is pivotably connected to an end of a crank and each of the pedal boards is connected to or integral with a guide rod extending rearwardly from the pedal board. The guide rods are supported by a rear drive assembly comprising a transverse tube that is horizontally connected to a frame of the bicycle. A roller is mounted at each end of the transverse tube. Each roller has a groove which accommodates the cross-section of the guide rod.

16 Claims, 6 Drawing Sheets (51) Int. Cl.
*B62M 1/28* (2013.01)
*B62M 1/26* (2013.01)
*B62K 3/00* (2006.01)

(52) U.S. Cl.
CPC ......... *B62M 1/28* (2013.01); *B62M 2700/006* (2013.01)

(56) References Cited

U.S. PATENT DOCUMENTS

| | | |
|---|---|---|
| 4,227,712 A | 10/1980 | Dick |
| 6,663,127 B2 | 12/2003 | Miller |
| 7,803,090 B2 | 9/2010 | Kraus |
| 7,967,313 B1 * | 6/2011 | Eggert .................... B62K 5/02 280/224 |
| 8,162,338 B2 | 4/2012 | Teal et al. |
| 8,220,814 B1 | 7/2012 | Riviglia et al. |
| 9,527,547 B2 * | 12/2016 | Thomas ................... B62M 1/26 |
| D776,015 S * | 1/2017 | Teal .............................. D12/111 |
| 2002/0130484 A1 | 9/2002 | Fa-Kuang |
| 2007/0114749 A1 | 5/2007 | Tal |
| 2008/0116655 A1 | 5/2008 | Pate et al. |
| 2014/0367940 A1 | 12/2014 | Lin |

FOREIGN PATENT DOCUMENTS

| | | |
|---|---|---|
| FR | 2876656 A1 | 4/2006 |
| KR | 20110059317 * | 6/2011 |
| TW | 564233 B | 12/2003 |
| WO | WO-2006076823 A1 | 7/2006 |
| WO | WO-2010050749 A2 | 5/2010 |
| WO | WO-2011065637 A1 | 6/2011 |

* cited by examiner

BICYCLE WITH REAR DRIVE ASSEMBLY FOR ELLIPTICAL MOVEMENT

CROSS REFERENCE TO RELATED APPLICATION(S)

This application is a continuation application of U.S. patent application Ser. No. 14/396,488, filed on Oct. 23, 2014, issued on Feb. 16, 2016 as U.S. Pat. No. 9,260,156, which is a 371 of PCT/BR2013/000473, filed Nov. 7, 2013, which claims priority from Brazilian Patent Application. No. BR 10 2012 028693 9, filed Nov. 9, 2012, which is hereby incorporated herein by reference in its entirety.

FIELD

Embodiments disclosed herein relate generally to the field of bicycles, and, more specifically, to bicycles having a rear drive assembly that enables cyclists to ride in an erect position.

BACKGROUND

Conventional bicycles include a normally tubular frame with a front wheel capable of being steered by a handlebar, as well as a rear wheel equipped with a ratchet mechanism mounted on the rear wheel's hub. The ratchet mechanism is driven by a chain that extends around a sprocket driven by pedals mounted on cranks. This type of bicycle, according to the most varied types of configurations, has a seat on which a cyclist can sit. Nonetheless, the movement carried out by the user of this bicycle is a cyclical motion and therefore not natural, like walking.

Attempts have been made to introduce a type of drive for bicycles whereby a cyclist can ride a vehicle of this kind while in an erect position, as in U.S. Pat. No. 8,162,338, issued Apr. 24, 2012, where the rear portion of the proposed bicycle has a structure where the sprocket is mounted and connected to the ratchet mechanism via a chain. With this type of bicycle, the sprocket is driven by cranks that, instead of being equipped with conventional pedals, are linked to long rods whose ends include platforms for the cyclist's feet. One platform is provided for the right foot and another platform is provided for the left foot. Each platform has its own rod for connection to the crank.

In this type of bicycle, the front end of each platform for a cyclist's feet contains a pulley that moves on a tubular track positioned in a slightly tilted manner, so that the cyclist travels forward in an alternating manner on the platforms via elliptical movements that are similar to normal human striding. These movements are translated into an angular oscillating motion of the rods and are subsequently converted into the rotary motion of the sprocket to produce the corresponding movement of rotary motion of the ratchet mechanism connected to the hub of the rear wheel.

This type of bicycle has a series of disadvantages that, for example, include the fact that substantial alteration of a bicycle's structure is necessary in order to accommodate the sprocket/ratchet assembly located above the rear wheel in the rear portion, thus creating an unusually and excessively complex design structure with costs exceeding the normal costs associated with ordinary bicycles.

Another conventional design includes the design for a vehicle described by U.S. Pat. No. 7,803,090, issued Sep. 28, 2010. This vehicle is not actually a bicycle because it has three wheels, with two front wheels and one rear wheel.

The vehicle described in U.S. Pat. No. 7,803,090 is a hybrid tricycle with a drive system generically analogous to the one described in document U.S. Pat. No. 8,162,338, since it uses rods connected to mountings for the feet in order to directly move the rear wheel. This constitutes the drive unit for the vehicle.

The aforementioned tricycle consists of an elliptical machine that imitates normal human striding, and its steering is even more complex and is based on a design where simplicity is not a priority. It is also a relatively long, wide, and heavy machine, and therefore constitutes a limited means of transportation.

Additionally, in relation to these types of vehicles belonging to the state of the art and more specifically in terms of this last example of a three-wheeled vehicle, also known as "Street Strider," a shared feature can be observed whereby both of them produce a form of movement of the cyclist's feet that can be regarded or defined as being essentially elliptical.

In general terms, the type of elliptical motion identified in the above two vehicles, and that can be defined as elliptical, has been found to be more efficient than the turning motion produced by more conventional bicycles, insofar as an elliptical trajectory more closely approximates the natural motion that characterizes human striding.

SUMMARY

Embodiments overcome the disadvantages of the prior art. Embodiments were developed in consideration of the previously described state of the art. Embodiments describe a bicycle's configuration partly being that of a conventional bicycle, while replacing the pedals with wide pedal boards to accommodate the cyclist's entire foot, and the pedal boards are mounted on respective cranks for driving a sprocket/ratchet system in a conventional manner. The system's ratchet mechanism is likewise mounted on the hub of the bicycle's rear wheel in a conventional manner.

Each pedal board on the bicycle has a guide rod that meets with a sliding mount on the rear portion of the bicycle. This mount can be based on adoption of a rotation for each of the rods, for example.

In a different manner from that which is observed among the above-mentioned conventional vehicles, embodiments provide a bicycle with pedal boards which provide circular motion that is naturally combined with angular motion controlled by the guide rods. As a result, the cyclist can ride in an erect position, while using movements that are entirely natural.

Embodiments favorably combine elementary aspects of conventional bicycles with a wholly innovative distinctive drive system, and a unique technical result is obtained from this synergistic combination, whereby this vehicle, in spite of its possessing a distinctive drive system, offers a mode of operation that is not unusual to cyclists.

Moreover, the bicycle is the result of a design that prioritizes structural simplicity and complete functionality. A vehicle that is capable of being produced on a large scale at an extremely competitive cost can, therefore, be obtained.

The type of movement obtained may be defined and regarded as essentially elliptical, as has been observed in relation to the state of the art examples mentioned above, with this type of movement being obtained based on a design that, as stated above, gives priority to structural simplicity and complete functionality. In this instance, the design results in a vehicle that can be manufactured in a more economical way by using standard and simpler parts and using a more conventional construction process that is available throughout the world. The bicycle provides a type of movement that simulates the way a human moves, in addition to being configured as a way to increase speed on straightaways and as a way to increase torque when the cyclist is using the bicycle to conquer steep terrain, such as hills, mountains, etc.

Furthermore, the bicycle has the role of a vehicle with applications for leisure, transportation, and sports that can be accomplished in a more ergonomic manner than what has been encountered with regard to conventional bicycles that, not infrequently, cause cyclists to experience discomfort that can include numbness in their hands and feet, and pain in the spine when used for longer distances, inter alia.

BRIEF DESCRIPTION OF THE DRAWINGS

The detailed description will refer to the following drawings, wherein like numerals refer to like elements, and wherein.

DETAILED DESCRIPTION

Figure 1:
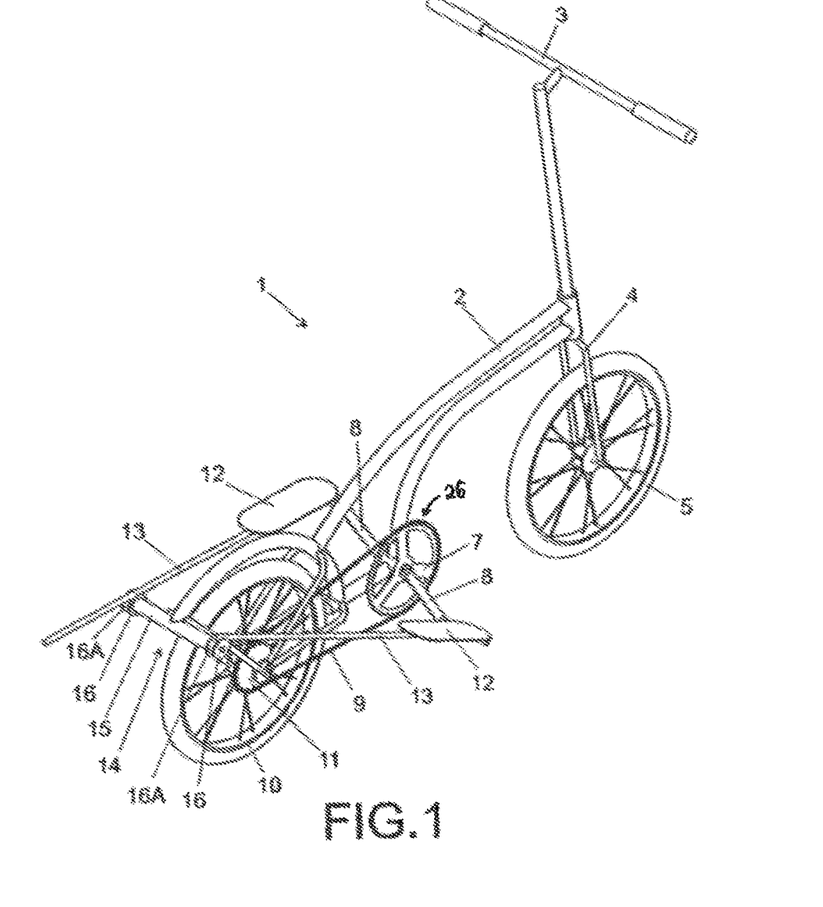
FIG. 1 illustrates a perspective view of a configuration of a bicycle being described herein.
Figure 2:
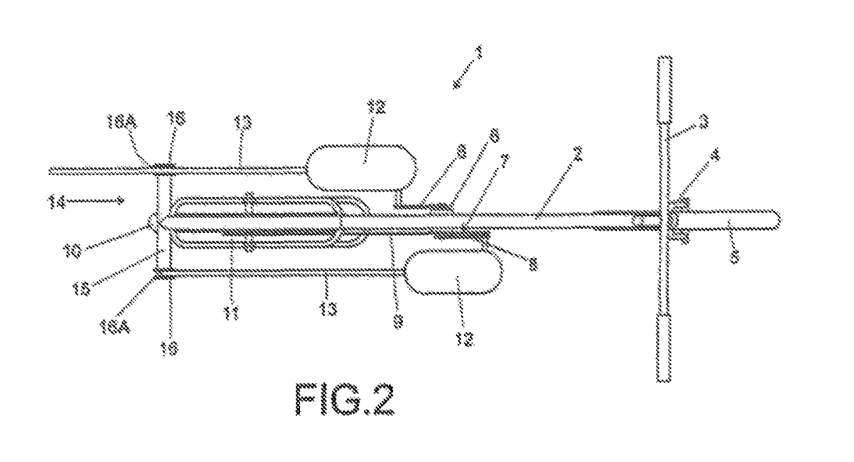
FIG. 2 illustrates an overhead view of the bicycle configuration shown in FIG. 1.

In accordance with that illustrated in the above-described drawings, FIG. 1 illustrates a bicycle 1 which has a tubular frame 2, that, in a conventional manner, includes a front handlebar 3 for controlling/steering a front wheel 5 via a fork 4 which is operatively connected between the handlebar 3 and the front wheel 5. The tubular frame 2 is outfitted with a central moving assembly 26 that includes a sprocket 7. FIG. 2 illustrates an overhead view of the bicycle 1 shown in FIG. 1.

The sprocket 7 has respective cranks 8 and is surrounded by a chain 9 extending toward the rear portion of the tubular frame 2, towards the location where the rear wheel 10 is mounted and driven by a ratchet mechanism 11 as is conventionally known.

A difference of the bicycle 1 as compared to conventional bicycles is that the front end of each of the pedal boards 12 pivots on the ends of the respective cranks 8, with a guide rod 13 extending from each pedal board 12 in the opposite direction. In other words, the front end of each of the pedal boards is pivotably connected to an end of the crank, and each of the pedal boards are connected to or integral with a guide rod extending rearwardly from the pedal board.

Figure 3A:
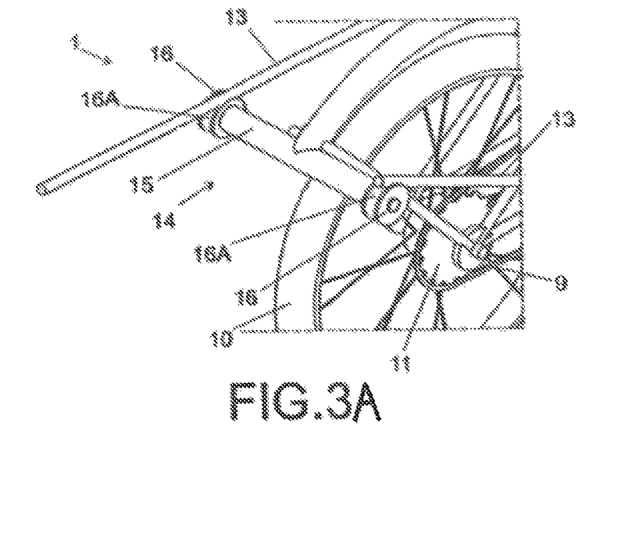
FIG. 3A illustrates a detailed perspective view of the rear portion of the bicycle described herein, depicting where mountings/rollers for the guide rods are located.

FIG. 3A illustrates a detailed perspective view of the rear portion of the bicycle 1, depicting where mountings (main rollers 16) for the guide rods 13 are located. The guide rods 13 are supported on the rear drive assembly (or rear sliding support assembly) 14 which comprises a transverse tube 15 horizontally integral with the frame 2. Each end of the transverse tube 15 accommodates a roller 16 containing a groove 16A which is suitably sized for accommodating the cross-section of the corresponding guide rod 13.

The bicycle 1 is propelled by the action of the sprocket 7 via the cranks 8, and this assembly rotates around the central moving axle 6. The cranks 8 and the pedal boards 12 rotate around the same axle 6 in the central moving assembly 26. The pedal boards 12 pivot while they execute angular movement determined by the positioning of the guide rods 13 on the respective roller 16.

As can be easily understood, the movement that propels the bicycle 1 is much more natural because the pedal boards 12 rotate around the sprocket 7 in a manner analogous to that which is observed in relation to pedals on conventional bicycles.

The rear drive assembly and use of the guide rods and pivotable pedal boards allow the cyclist to operate the bicycle in an erect position without requiring elimination of the conventional power transmission system that begins with the cranks 8, passing through the sprocket 7 and the chain 9, and ending at the ratchet mechanism 11 and the rear wheel 10.

Figure 3B:
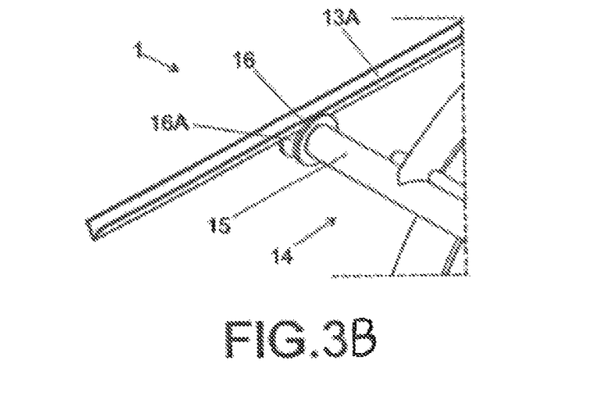
FIG. 3B illustrates an enlarged detailed schematic view taken from a portion of FIG. 3A, which depicts a first variation of the assembly formed by the mountings and the guide rods.

A first variation of bicycle 1 is illustrated in FIG. 3B. This variation differs from the principal configuration of FIGS. 1-3A insofar as the rear drive assembly 14, in general, where there are rollers 16 with a groove 16A configured to accommodate a guide rod 13A having a V-shaped profile.

Figure 3C:
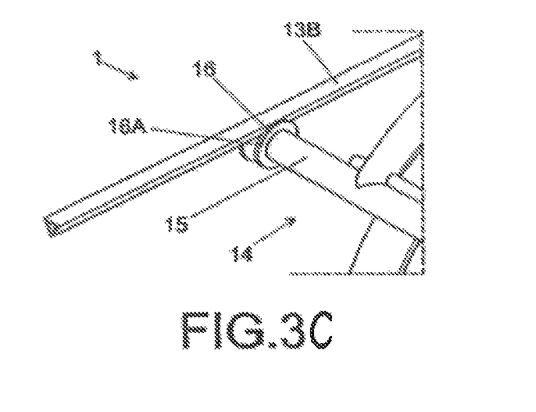
FIG. 3C illustrates an enlarged detailed schematic view taken from a portion of FIG. 3A, which depicts a second variation of the assembly formed by the mountings and the guide rods.

FIG. 3C illustrates a second variation of a rear drive assembly 14 of bicycle 1, where a roller 16 is provided having a groove 16A configured to accommodate a guide rod 13B having a triangular tubular profile.

Figure 4:
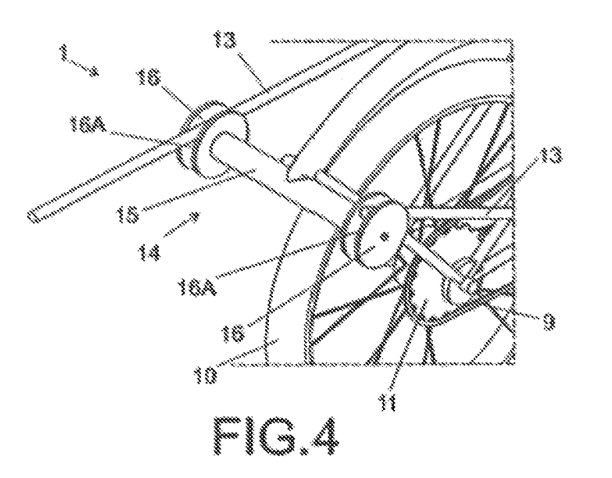
FIG. 4 illustrates a detailed perspective view of the rear portion of the bicycle described herein, depicting a third variation of the assembly formed by the mountings and the guide rods.

FIG. 4 illustrates a third variation of a rear drive assembly 14 of bicycle 1. In rear drive assembly 14, rollers 16 with grooves 16A that are proportionally deeper are provided, and this fact increases the actual retention capability for the guide rods 13 to be supported within the grooves 16A of the rollers 16.

Figure 5:
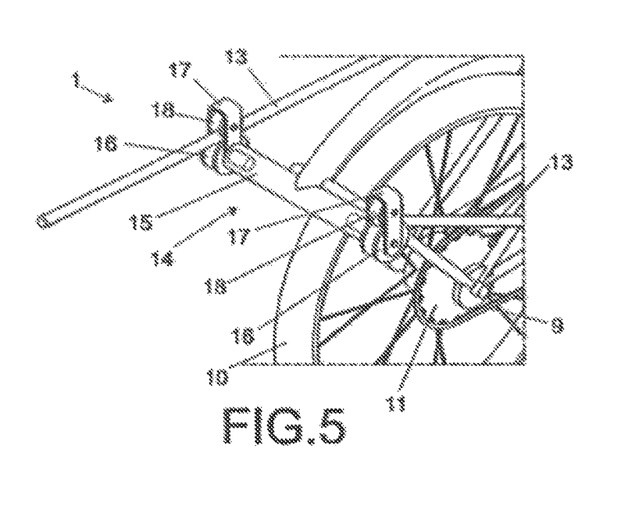
FIG. 5 illustrates a detailed perspective view of the rear portion of the bicycle described herein, depicting a fourth variation of the assembly formed by the mountings and the guide rods.

A fourth variation of bicycle 1 is illustrated in FIG. 5, where rear drive assembly 14 includes a structure 17 in the shape of an inverted "U" around each roller 16. In its upper portion, this U-shaped structure 17 has an auxiliary roller 18 that may have a smaller diameter than the diameter chosen for the rollers 16.

The U-shaped structure 17 is mounted in such a manner as to rotate around the same shaft 20 as its respective roller 16, thereby allowing the auxiliary roller 18 to be capable of assuming a position of opposition to the movement of the guide rod 13 when moving away from the roller 16 at any angle that may be assumed by the guide rod 13 during its movement.

Figure 6:
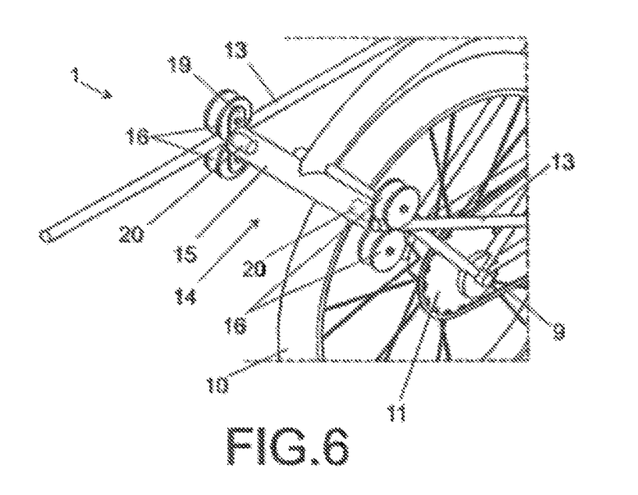
FIG. 6 illustrates a detailed perspective view of the rear portion of the bicycle described herein, depicting a fifth variation of the assembly formed by the mountings and the guide rods.

FIG. 6 illustrates a fifth variation of a rear drive assembly 14 of bicycle 1, where rear drive assembly 14 involves the use of a pair of rollers 16 (i.e., the primary roller and a secondary roller) that are mounted on a pivoting structure 19 (of which only one is visible) that rotates around respective shafts 20, with the rollers 16 of this fifth variation being of the same type as the rollers 16 provided in the principal configuration of rear drive assembly 14 illustrated in FIGS. 1-3A described above.

In any of the above-mentioned variations of the rear drive assembly 14 of bicycle 1 illustrated in FIGS. 1-6, each of the guide rods 13, 13A, 13B is positioned so as to maintain permanent contact with the rollers 16 of rear drive assembly 14 during the entire cycle of movement of the pedal boards 12.

Figure 7:
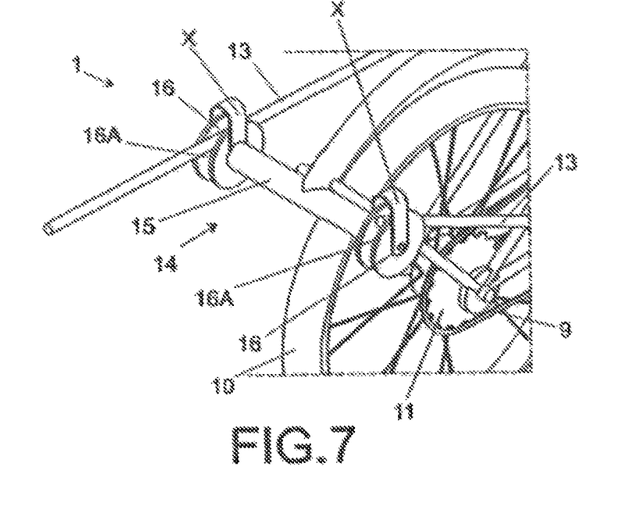
FIG. 7 illustrates a detailed perspective view of the rear portion of the bicycle described herein, depicting a sixth variation of the assembly formed by the mountings and the guide rods, where a pivoting retaining ring is provided for each rod on each of the rollers. This ring's function is to prevent the rods from coming out of their respective rollers.

Following the same principle above, a sixth variation of a rear drive assembly 14 of bicycle 1 is illustrated in FIG. 7. In this variation, the rear drive assembly 14 includes a retaining ring X which pivots about each of the respective rollers 16. Retaining ring X also has the function of preventing the guide rods 13 from coming out of their respective grooves 16A.

The bicycle, 1, being described herein presents a substantially simpler and more functional configuration when compared to the conventional vehicles mentioned above representing the state of the art.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A bicycle with a rear drive assembly configured to allow pedal boards to be pivotable while moving in an elliptical trajectory, the bicycle comprising:
    a front wheel;
    a rear wheel having a ratchet mounted thereon for driving the rear wheel;
    a frame including a front handlebar that controls the front wheel via a fork which is operatively connected between the handlebar and the front wheel;
    a central drive assembly including a sprocket and cranks extending from the sprocket;
    a chain surrounding the sprocket and extending toward a rear portion of the frame in order to drive the ratchet;
    pedal boards having front and rear ends, wherein the pedal boards are pivotably connected to the cranks;
    a guide rod extending rearwardly from each of the pedal boards; and
    a rear drive assembly comprising:
        a transverse tube connected to the frame; and
        primary rollers mounted at opposite sides of the transverse tube, the primary rollers configured to guide the guide rods;
    wherein the pedal boards are pivotable while moving in an elliptical trajectory; and
    wherein the primary rollers have grooves along perimeters of the primary rollers that accommodate cross-sections of the guide rods.

2. The bicycle of claim 1 wherein the guide rod extends from the rear end of each of the pedal boards.

3. The bicycle of claim 1 wherein the pedal boards are pivotably connected to ends of the cranks.

4. The bicycle of claim 1 wherein the front ends of the pedal boards are pivotably connected to the cranks.

5. The bicycle of claim 1 wherein the primary rollers are mounted at ends of the transverse tube that are at the opposite sides of the transverse tube.

6. A bicycle with a rear drive assembly configured to allow pedal boards to be pivotable while moving in an elliptical trajectory, the bicycle comprising:
    a front wheel;
    a rear wheel having a ratchet mounted thereon for driving the rear wheel;
    a frame including a front handlebar that controls the front wheel via a fork which is operatively connected between the handlebar and the front wheel;
    a central drive assembly including a sprocket and cranks extending from the sprocket;
    a chain surrounding the sprocket and extending toward a rear portion of the frame in order to drive the ratchet;
    pedal boards having front and rear ends, wherein the pedal boards are pivotably connected to the cranks;
    a guide rod extending rearwardly from each of the pedal boards; and
    a rear drive assembly comprising:
        a transverse tube connected to the frame; and
        primary rollers mounted at opposite sides of the transverse tube, the primary rollers configured to guide the guide rods;
    wherein the pedal boards are pivotable while moving in an elliptical trajectory; and
    wherein each of the guide rods has a V-shaped cross-sectional profile extending longitudinally along the guide rod, wherein each primary roller has a groove along its perimeter that is configured to accommodate the guide rod having the V-shaped cross-sectional profile.

7. A bicycle with a rear drive assembly configured to allow pedal boards to be pivotable while moving in an elliptical trajectory, the bicycle comprising:
    a front wheel;
    a rear wheel having a ratchet mounted thereon for driving the rear wheel;
    a frame including a front handlebar that controls the front wheel via a fork which is operatively connected between the handlebar and the front wheel;
    a central drive assembly including a sprocket and cranks extending from the sprocket;
    a chain surrounding the sprocket and extending toward a rear portion of the frame in order to drive the ratchet;
    pedal boards having front and rear ends, wherein the pedal boards are pivotably connected to the cranks;
    a guide rod extending rearwardly from each of the pedal boards; and
    a rear drive assembly comprising:
        a transverse tube connected to the frame; and
        primary rollers mounted at opposite sides of the transverse tube, the primary rollers configured to guide the guide rods;
    wherein the pedal boards are pivotable while moving in an elliptical trajectory; and
    wherein each of the guide rods has a tubular triangular cross-sectional profile extending longitudinally along the guide rod, wherein each primary roller has a groove along its perimeter that is configured to accommodate the guide rod having the tubular triangular cross-sectional profile.

8. A bicycle with a rear drive assembly configured to allow pedal boards to be pivotable while moving in an elliptical trajectory, the bicycle comprising:
   a front wheel;
   a rear wheel having a ratchet mounted thereon for driving the rear wheel;
   a frame including a front handlebar that controls the front wheel via a fork which is operatively connected between the handlebar and the front wheel;
   a central drive assembly including a sprocket and cranks extending from the sprocket;
   a chain surrounding the sprocket and extending toward a rear portion of the frame in order to drive the ratchet;
   pedal boards having front and rear ends, wherein the pedal boards are pivotably connected to the cranks;
   a guide rod extending rearwardly from each of the pedal boards; and
   a rear drive assembly comprising:
      a transverse tube connected to the frame; and
      primary rollers mounted at opposite sides of the transverse tube, the primary rollers configured to guide the guide rods;
   wherein the pedal boards are pivotable while moving in an elliptical trajectory; and
   wherein a cross-section of each guide rod is accommodated by a groove along a perimeter of each primary roller, wherein the groove has a depth which is suitably large so as to completely contain the cross-section of the guide rod.

9. A bicycle with a rear drive assembly configured to allow pedal boards to be pivotable while moving in an elliptical trajectory, the bicycle comprising:
   a front wheel;
   a rear wheel having a ratchet mounted thereon for driving the rear wheel;
   a frame including a front handlebar that controls the front wheel via a fork which is operatively connected between the handlebar and the front wheel;
   a central drive assembly including a sprocket and cranks extending from the sprocket;
   a chain surrounding the sprocket and extending toward a rear portion of the frame in order to drive the ratchet;
   pedal boards having front and rear ends, wherein the pedal boards are pivotably connected to the cranks;
   a guide rod extending rearwardly from each of the pedal boards; and
   a rear drive assembly comprising:
      a transverse tube connected to the frame; and
      primary rollers mounted at opposite sides of the transverse tube, the primary rollers configured to guide the guide rods;
   wherein the pedal boards are pivotable while moving in an elliptical trajectory; and
   wherein the rear drive assembly further comprises a U-shaped structure positioned around each of the primary rollers, an upper portion of the U-shaped structure contains an auxiliary roller, whereby the auxiliary roller and the primary roller accommodate and allow sliding of the guiding rod therebetween.

10. The bicycle of claim 9 wherein the U-shaped structure and the primary roller are mounted so that they are rotatable around a common shaft.

11. The bicycle of claim 9 wherein the primary rollers have grooves along perimeters of the primary rollers that accommodate cross-sections of the guide rods.

12. A bicycle with a rear drive assembly configured to allow pedal boards to be pivotable while moving in an elliptical trajectory, the bicycle comprising:
   a front wheel;
   a rear wheel having a ratchet mounted thereon for driving the rear wheel;
   a frame including a front handlebar that controls the front wheel via a fork which is operatively connected between the handlebar and the front wheel;
   a central drive assembly including a sprocket and cranks extending from the sprocket;
   a chain surrounding the sprocket and extending toward a rear portion of the frame in order to drive the ratchet;
   pedal boards having front and rear ends, wherein the pedal boards are pivotably connected to the cranks;
   a guide rod extending rearwardly from each of the pedal boards; and
   a rear drive assembly comprising:
      a transverse tube connected to the frame; and
      primary rollers mounted at opposite sides of the transverse tube, the primary rollers configured to guide the guide rods;
   wherein the pedal boards are pivotable while moving in an elliptical trajectory; and
   wherein the rear drive assembly further comprises a secondary roller positioned opposite each of the primary rollers, whereby the secondary roller and the primary roller accommodate and allow sliding of the guiding rod therebetween.

13. The bicycle of claim 12 wherein the secondary roller and the primary roller are mounted in a pivoting structure that is rotatable around a common shaft.

14. The bicycle of claim 12 wherein the primary rollers have grooves along perimeters of the primary rollers that accommodate cross-sections of the guide rods.

15. A bicycle with a rear drive assembly configured to allow pedal boards to be pivotable while moving in an elliptical trajectory, the bicycle comprising:
   a front wheel;
   a rear wheel having a ratchet mounted thereon for driving the rear wheel;
   a frame including a front handlebar that controls the front wheel via a fork which is operatively connected between the handlebar and the front wheel;
   a central drive assembly including a sprocket and cranks extending from the sprocket;
   a chain surrounding the sprocket and extending toward a rear portion of the frame in order to drive the ratchet;
   pedal boards having front and rear ends, wherein the pedal boards are pivotably connected to the cranks;
   a guide rod extending rearwardly from each of the pedal boards; and
   a rear drive assembly comprising:
      a transverse tube connected to the frame; and
      primary rollers mounted at opposite sides of the transverse tube, the primary rollers configured to guide the guide rods;
   wherein the pedal boards are pivotable while moving in an elliptical trajectory; and
   wherein the rear drive assembly further comprises a retaining ring pivotably mounted around each of the primary rollers, wherein the retaining ring and the primary roller are positioned to accommodate and allow sliding of the guiding rod therebetween.

16. The bicycle of claim 15 wherein the primary rollers have grooves along perimeters of the primary rollers that accommodate cross-sections of the guide rods.

\* \* \* \* \*